US011885977B2

(12) United States Patent
Seo et al.

(10) Patent No.: US 11,885,977 B2
(45) Date of Patent: Jan. 30, 2024

(54) CAMERA MODULE (71) Applicant: Samsung Electro-Mechanics Co., Ltd., Suwon-si (KR)

(72) Inventors: Bo Sung Seo, Suwon-si (KR); Jung Seok Lee, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 670 days.

(21) Appl. No.: 16/924,331

(22) Filed: Jul. 9, 2020

(65) Prior Publication Data

US 2021/0173223 A1 Jun. 10, 2021

(30) Foreign Application Priority Data

Dec. 10, 2019 (KR) .................. 10-2019-0164032

(51) Int. Cl.
*G02B 27/64* (2006.01)
*G03B 5/00* (2021.01)
*G02B 7/09* (2021.01)
*G03B 13/36* (2021.01)
*G02B 13/00* (2006.01)

(52) U.S. Cl.
CPC ............ *G02B 27/646* (2013.01); *G02B 7/09* (2013.01); *G03B 5/00* (2013.01); *G03B 13/36* (2013.01); *G02B 13/001* (2013.01); *G03B 2205/0007* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| 8,818,181 | B1 | 8/2014 | Hwang et al. |
| 10,747,013 | B2 | 8/2020 | Lim |
| 2010/0182490 | A1 | 7/2010 | Seol et al. |
| 2014/0160311 | A1* | 6/2014 | Hwang .............. H02K 41/0356 |
| | | | 348/208.99 |

(Continued)

FOREIGN PATENT DOCUMENTS

| CN | 101743743 A | 6/2010 |
| CN | 106707454 A | 5/2017 |

(Continued)

OTHER PUBLICATIONS

Chinese Office Action dated Dec. 3, 2021 in corresponding Chinese Patent Application No. 202011007853.X (10 pages in English and 7 pages in Chinese).

(Continued)

*Primary Examiner* — Derek S. Chapel
(74) *Attorney, Agent, or Firm* — NSIP Law (57) ABSTRACT

A camera module includes a carrier supported on a housing and movable in an optical axis direction, a frame supported on the carrier and movable, relative to the carrier, in a first direction perpendicular to the optical axis direction, and a lens module supported on the frame and movable, relative to the frame, in a second direction perpendicular to the optical axis direction. One of the frame and the lens module is supported such that attractive force acts in one of the first direction and the second direction.

16 Claims, 7 Drawing Sheets

(56) References Cited

U.S. PATENT DOCUMENTS

| | | | |
|---|---|---|---|
| 2015/0049209 A1 | 2/2015 | Hwang et al. | |
| 2017/0139225 A1 | 5/2017 | Lim | |
| 2018/0356609 A1* | 12/2018 | Kim | G03B 3/10 |
| 2019/0004328 A1 | 1/2019 | Lee et al. | |
| 2019/0196300 A1* | 6/2019 | Kim | H02K 41/0356 |
| 2019/0204532 A1* | 7/2019 | Konuma | G02B 13/001 |
| 2020/0050013 A1* | 2/2020 | Rhee | G03B 5/02 |
| 2021/0173224 A1* | 6/2021 | Seo | G03B 13/36 |
| 2022/0155652 A1* | 5/2022 | Seo | G03B 5/04 |
| 2023/0090273 A1* | 3/2023 | Park | G02B 7/09 |

FOREIGN PATENT DOCUMENTS

| | | | |
|---|---|---|---|
| CN | 108732713 A | 11/2018 | |
| JP | 2017-90887 A | 5/2017 | |
| KR | 10-2009-0008566 A | 1/2009 | |
| KR | 10-2015-0020951 A | 2/2015 | |
| KR | 10-1600574 B1 | 3/2016 | |
| KR | 10-1673428 B1 | 11/2016 | |
| KR | 10-2018-0024145 A | 3/2018 | |
| KR | 10-2019-0004121 A | 1/2019 | |
| WO | WO 2009/011547 A1 | 1/2009 | |

OTHER PUBLICATIONS

Korean Office Action dated Sep. 9, 2020 in counterpart Korean Patent Application No. 10-2019-0164032 (8 pages in English and 6 pages in Korean).

Chinese Office Action dated Jun. 21, 2022, in counterpart Chinese Patent Application No. 202011007853.X (6 pages in English and 6 pages in Chinese).

* cited by examiner

CAMERA MODULE

CROSS-REFERENCE TO RELATED APPLICATION(S)

This application claims the benefit under 35 USC 119(a) of Korean Patent Application No. 10-2019-0164032 filed on Dec. 10, 2019 in the Korean Intellectual Property Office, the entire disclosure of which is incorporated herein by reference for all purposes.

BACKGROUND

1. Field

This application relates to a camera module.

2. Description of Related Art

The use of subminiature camera modules in mobile communications terminals such as smartphones, tablet PCs, laptop computers, and the like, has increased.

With the miniaturization of mobile communications terminals, the quality of images obtained by such terminals may be degraded because such terminals are often held by hand while images are captured. To obtain clear images despite instability introduced into images due to the inadvertent shaking of hands holding the terminals, a technology that compensates for the effect of shaking is required.

An actuator for optical image stabilization (OIS) may be used to compensate for involuntary shaking introduced due to instability of hands holding the terminals. An OIS actuator may move a lens module in a direction, perpendicular to an optical axis direction, to compensate for the involuntary shaking.

A structure, in which a plurality of cameras including a wide-angle camera and a telephoto camera are mounted adjacent to a mobile terminal, has been implemented to improve the performance of camera functions.

However, when an OIS actuator using a magnet and a coil is employed for miniaturization and accuracy in driving, performance is deteriorated due to self-interference between camera modules adjacent to each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An actuator having a structure provided with a magnet and a coil.

A structure, capable of significantly reducing leakage of a magnetic field while employing an actuator using a magnetic field and a coil for miniaturization and accurate driving.

A camera module that significantly reduces self-interference such that a plurality of camera modules may be freely arranged even when they are disposed adjacent to each other.

In one general aspect, a camera module includes a carrier supported on a housing and movable in an optical axis direction, a frame supported on the carrier and movable, relative to the carrier, in a first direction, perpendicular to the optical axis direction, and a lens module supported on the frame and movable, relative to the frame, in a second direction, perpendicular to the optical axis direction. One of the frame and the lens module is supported such that attractive force acts in one of the first direction and the second direction.

The other of the frame and the lens module may be arranged such that attractive force does not act between a relative member and the frame in one of the first direction and the second direction.

The other of the frame and the lens module may be arranged such that attractive force acts between a relative member and the frame in the optical axis direction.

The other of the frame and the lens module may include a driving magnet, and the driving magnet may be arranged to have an interval with a yoke, disposed on the relative member, in the optical axis direction.

The housing may include a side surface on which one of the frame and the lens module is supported, and a yoke formed of a material configured to prevent leakage of a magnetic field may be disposed on the side surface.

The frame may be supported such that attractive force acts with respect to the carrier in one of the first direction and the second direction, and the lens module maybe supported such that attractive force acts with respect to the frame in the optical axis direction.

The frame may include a first magnet, the housing may include a first yoke, and the first magnet and the first yoke may be arranged to have an interval in the second direction.

The frame may include a first magnet, and the first magnet may be magnetized along a surface opposing the carrier in one of the first direction and the second direction to have at least an N-pole and an S-pole.

The lens module may include a second magnet, and a surface of the second magnet opposing the carrier may be magnetized to a single pole or a plurality of poles.

The frame may include a first magnet and the lens module may include a second magnet, the first magnet may generate force such that the frame is moved relatively in a direction parallel to a surface opposing the carrier by interaction with a first coil, and the second magnet may generate force such that the lens module is moved relatively in a direction perpendicular to a surface opposing the frame by interaction with a second coil.

The first magnet and the second magnet may be disposed to oppose each other about an optical axis.

The lens module may include a second magnet to generate force to move the lens module, and one of a third magnet, independent of the second magnet, and a third yoke, and the frame may include the other of the third magnet and the third yoke to oppose the third magnet or the third yoke in the optical axis direction.

The camera module may include three rolling members disposed between the lens module and a surface of the frame in the optical axis direction, and the second magnet may be disposed between two rolling members, among the three rolling members, and the third magnet or the third yoke may be disposed closest to the other rolling member.

The three rolling members may be disposed to approximately form a right triangle.

In another general aspect, a camera module includes a carrier supported on a housing and movable in an optical axis direction, a frame supported on the carrier and including a first magnet movable, relative to the carrier, in a first direction perpendicular to the optical axis direction, and a lens module supported on the frame and including a second magnet movable, relative to the frame, in a second direction perpendicular to the optical axis direction. One of the first magnet and the second magnet is magnetized along a surface opposing a relative member in one of the first direction and the direction to have at least an N-pole and an S-pole. The other of the first magnet and the second magnet is magnetized such that the surface opposing the relative member has a single pole or a plurality of poles.

In another general aspect, a camera module includes an autofocusing part including a carrier disposed on a housing to be movable in an optical axis direction, a shake correction portion including a lens module to be movable, relative to the carrier, in a direction perpendicular to the optical axis direction, and an autofocusing coil to provide driving force to the autofocusing part, and first and second shake correction coils to provide driving force to the shake correction portion. The autofocusing coil and the first and second shake correction coils are each disposed on a surface of the housing disposed to be parallel to the optical axis direction. The housing includes a plurality of yokes, respectively covering the autofocusing coil and one of the first and second shake correction coils to prevent leakage of a magnetic field.

In another general aspect, a camera module includes a frame including a first magnet to generate force to move the frame along a first direction perpendicular to an optical axis; a lens holder coupled to the frame and including a second magnet to generate force to move the lens holder relative to the frame along a second direction perpendicular to the optical axis, the second magnet being disposed opposite to the first magnet across the optical axis; and a lens barrel fixed to the lens holder to be moved along the first direction by movement of the frame and to be moved along the second direction by movement of the lens holder relative to the frame.

One of the first magnet and the second magnet may be a polarizing magnet, and the other of the first magnet and the second magnet may be a single pole magnet.

The camera module may include a first coil disposed to face the first magnet along the first direction; and a second coil disposed to face the second magnet along the first direction.

The camera module may include a first yoke disposed to oppose the first magnet along the first direction such that the first coil is interposed between the first yoke and the first magnet; and a second yoke disposed to oppose the second magnet in a direction parallel to the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, while examples of the present disclosure will be described in detail with reference to the accompanying drawings, it is noted that examples are not limited to the same.

The present disclosure relates to a camera module, and may be applied to portable electronic devices such as mobile communications terminals, smartphones, table PCs, and the like.

A camera module is an optical device for capturing still or moving images. A camera module may include a lens, refracting light reflected from a subject, and a lens driving device moving the lens to adjust a focus or to compensate for the shaking of the camera module while images are captured.

Figure 1:
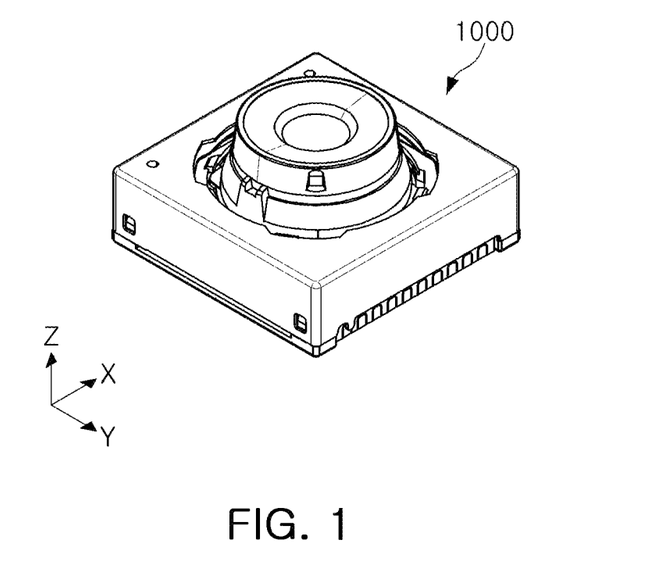
FIG. 1 is an assembled perspective view of a camera module according to an example.
Figure 2:
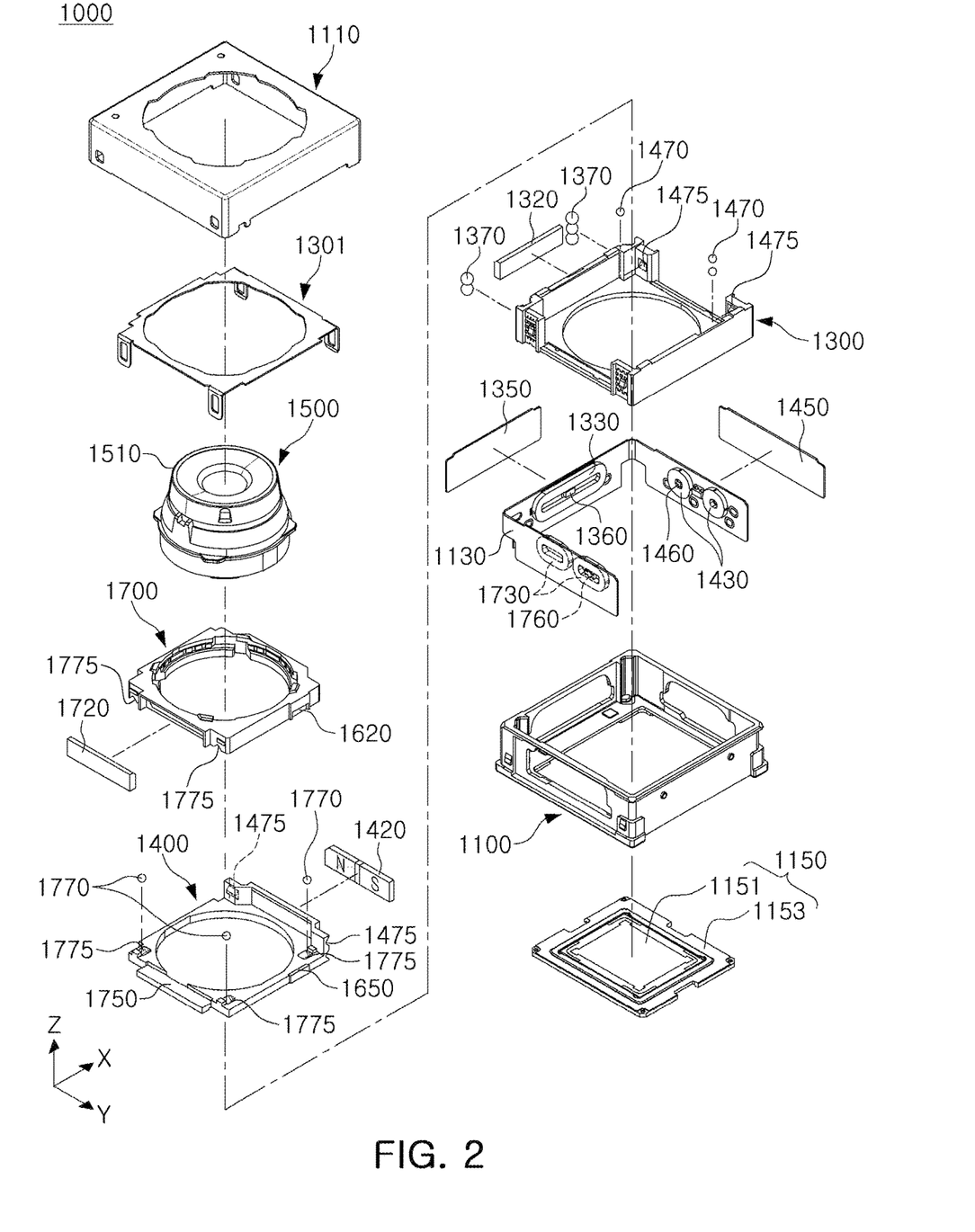
FIG. 2 is an exploded perspective view of a camera module according to an example.

FIG. 1 is an assembled perspective view of a camera module according to an example, and FIG. 2 is an exploded perspective view of a camera module according to an example.

Referring to FIGS. 1 and 2, a camera module 1000 may include a housing 1100, a lens module 1500 including a lens barrel 1510 accommodated in the housing 1100, a lens driving device moving the lens module 1500, and an image sensor unit 1150 converting light, incident through the lens barrel 1510, into an electrical signal. The camera module 1000 may further include a case 1110 or an upper cover 1301 covering the housing 1100 from above.

The lens barrel 1510 may be a hollow cylindrical shape allowing a plurality of lenses for capturing a subject to be accommodated therein (the configuration is not limited thereto, and the lens barrel 1510 may have a partially cut exterior, and the inside of the lens barrel 1510 may be provided with a circular lens or a D-cut lens, a lens having one partially cut side), and a plurality of lenses are mounted in the lens barrel 1510. The plurality of lenses is arranged in an amount as large as necessary depending on a design of the lens barrel 1510, and each of the plurality of lenses has the same or different optical characteristics such as the a refractive index, or the like.

The lens driving device moves the lens barrel 1510 in an optical axis direction or a direction perpendicular to the optical axis direction.

As an example, the lens driving device may move the lens barrel 1510 in an optical axis direction (a Z-axis direction) to adjust a focus, and may move the lens barrel 1510 in X-axis and Y-axis directions, perpendicular to the optical axis direction (the Z-axis direction), to correct shaking at the time of capturing an image.

The lens driving device includes a focusing unit (an autofocusing part) and a shake correction unit (a shake correction portion).

The image sensor unit 1150 converts light, incident through the lens barrel 1510, into an electrical signal.

As an example, the image sensor unit 1150 may include an image sensor 1151 and a printed circuit board (PCB) 1153 connected to the image sensor 1151, and may further include an infrared filter.

The lens module 1500, including the lens barrel 1510, and the lens driving device are accommodated in the housing 1100.

As an example, the housing 1100 has a shape with an open top and bottom, and the lens module 1500 and the lens driving device may be accommodated in an internal space of the housing 1100. The image sensor unit 1150 is disposed below the housing 1100.

The case 1110 is coupled to the housing 1100 to surround an external surface of the housing 1100, and serves to protect internal components of the camera module 1000. The case 1110 may serve to shield electromagnetic waves.

As an example, the case 1100 may shield electromagnetic waves generated by the camera module 1000 such that electromagnetic waves do not affect other electronic components in the portable electronic device.

Since a portable electronic device is equipped with various electronic components other than the camera module 1000, the case 1100 may shield electromagnetic waves generated by such electronic components such that the electromagnetic waves do not affect the camera module 1000.

Figure 3:
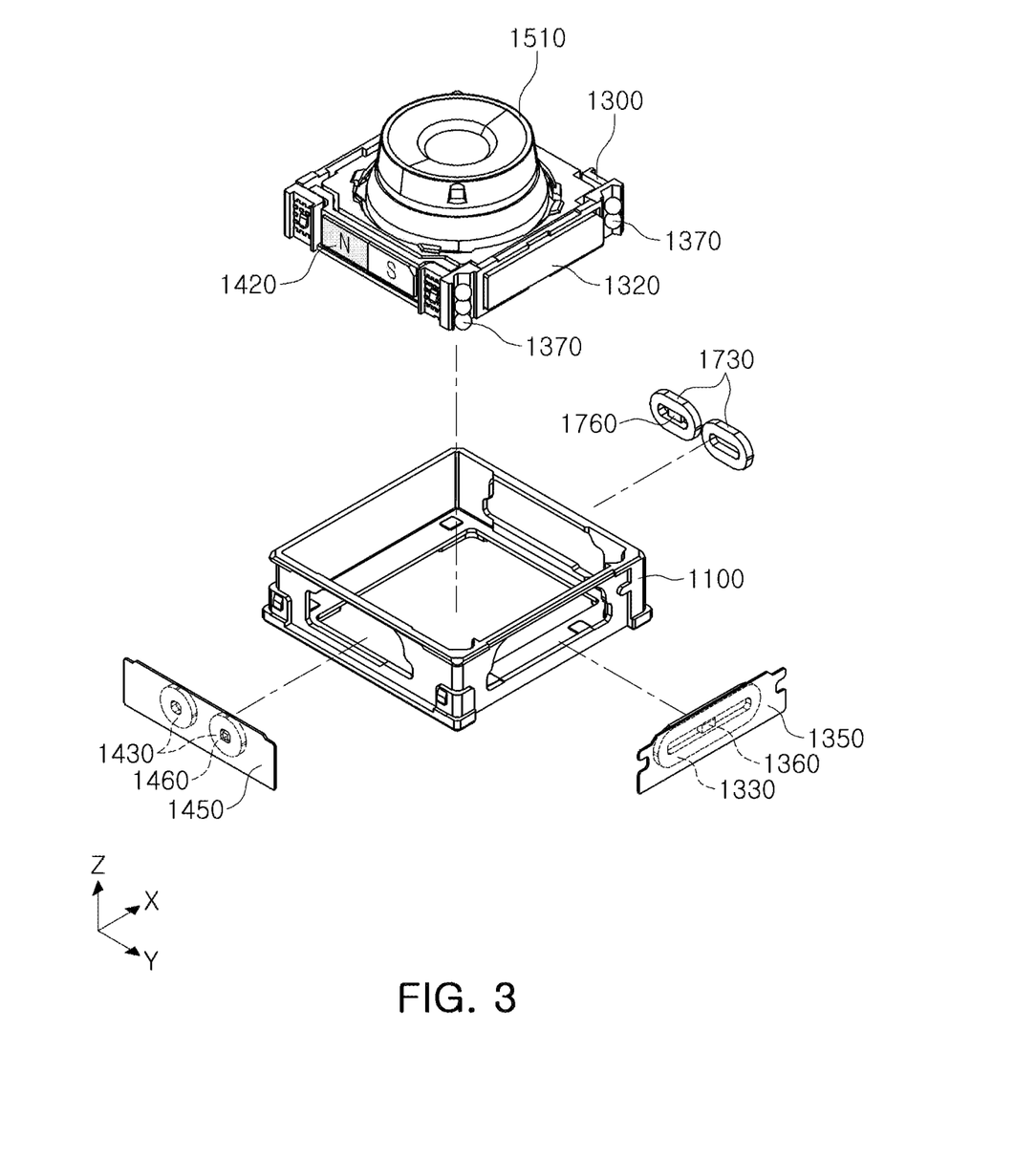
FIG. 3 is an exploded perspective view of a housing and a carrier according to an example.
Figure 4:
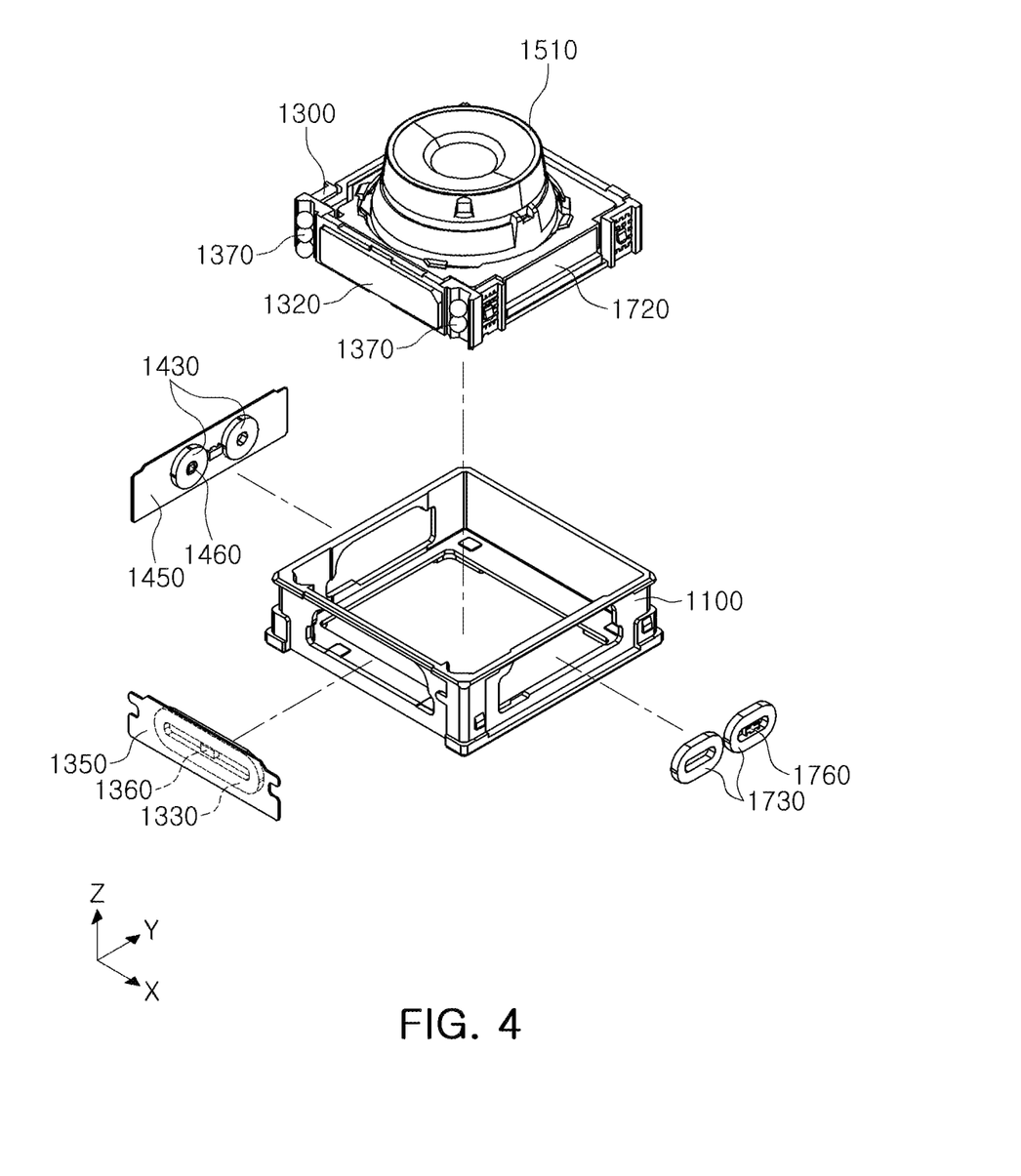
FIG. 4 is an exploded perspective view of a housing, a carrier, a frame, and a lens module according to an example.
Figure 5:
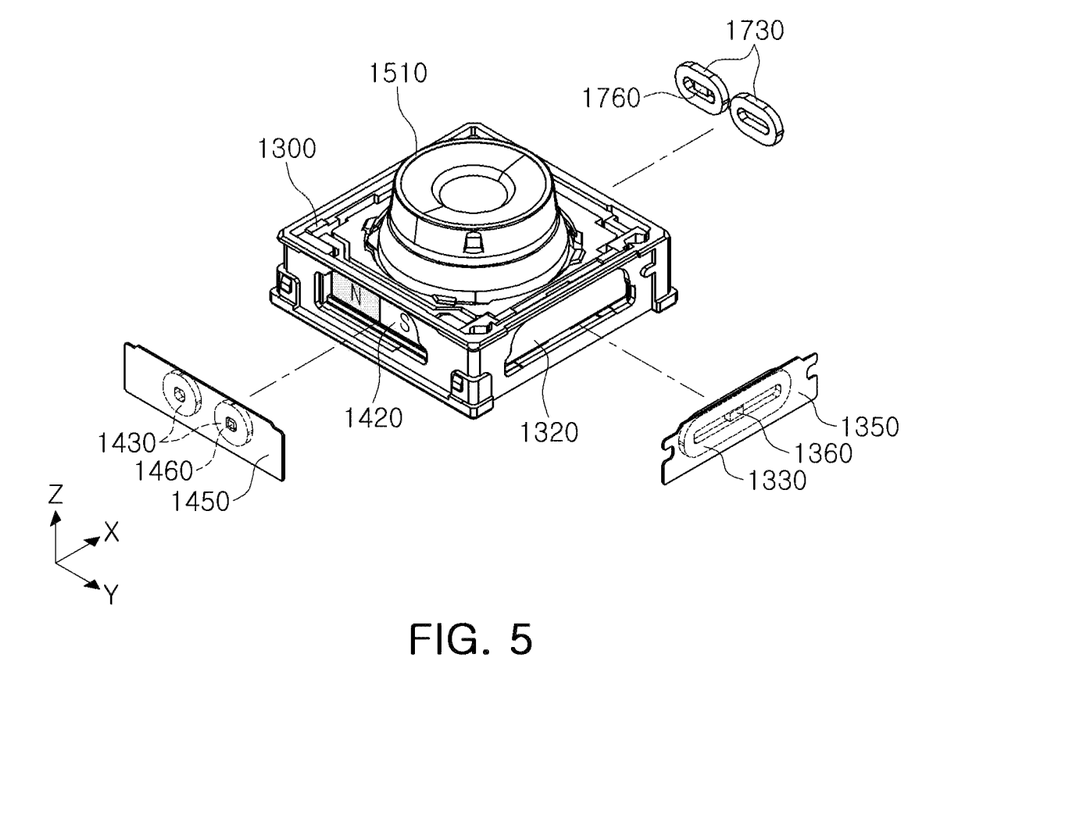
FIG. 5 is an assembled perspective view of a housing, a carrier, a frame, and a lens module according to an example.

Referring to FIGS. 2 and 3, the focusing unit of the lens driving device according to an example is illustrated.

The lens driving device includes a focusing unit, moving a carrier 1300 in an optical axis direction to perform autofocusing, and a shake correction unit moving the lens module 1500 disposed inside of the carrier 1300 in a direction perpendicular to the optical axis direction, to perform shake correction.

The focusing unit has a structure generating driving force to move the carrier 1300, accommodating the lens module 1500, in the optical axis direction (the Z-axis direction).

A driving portion of the focusing unit includes a magnet 1320 and a coil 1330. The magnet 1320 is mounted on the carrier 1300. As an example, the magnet 1320 may be mounted on one surface of the carrier 1300.

The coil 1330 is mounted in the housing 1100. As an example, the coil 1330 may be mounted in the housing 1100 through a substrate 1130. The coil 1330 may be fixed to the substrate 1130, and the substrate 1130 may be fixed to the housing 1100 in a state in which fixing driving coils of the shake correction unit to described later are also fixed together.

The magnet 1320 is a movable member mounted on the carrier 1300 to move in the optical axis direction (the Z-axis direction) together with the carrier 1300, and the coil 1330 is a fixed member fixed to the housing 1100. However, the configuration is not limited thereto, and positions of the magnet 1320 and the coil 1330 are interchangeable with each other.

When power is applied to the coil 1330, the carrier 1300 may be moved in the optical axis direction (the Z-axis direction) by electromagnetic interaction between the magnet 1320 and the coil 1330.

Since the lens barrel 1510 is accommodated in the carrier 1300, the lens barrel 1510 is also moved in the optical axis direction (the Z-axis direction) by the movement of the carrier 1300.

When the carrier 1300 is moved, a rolling member 1370 is disposed between the carrier 1300 and the housing 1100 to reduce friction between the carrier 1300 and the housing 1100. The rolling member 1370 may have a ball shape. Rolling members 1370 may be disposed on both sides of the magnet 1320.

A yoke 1350 is disposed in the housing 1100. For example, the yoke 1350 is disposed to oppose the magnet 1320 with the coil 1330 interposed therebetween. For example, the coil 1330 and the magnet 1320 are disposed to oppose each other, and the yoke 1350 is disposed on a rear surface of the coil 1330 such that the carrier 1300 is closely supported on the housing 1100 with the rolling member 1370 interposed therebetween.

Attractive force acts between the yoke 1350 and the magnet 1320 in a direction perpendicular to the optical axis direction (the Z-axis direction). Accordingly, the rolling member 1370 may be maintained in a state of contact with the carrier 1300 and the housing 1100 by the attractive force between the yoke 1350 and the magnet 1320.

The yoke 1350 may also serve to focus magnetic force of the magnet 1320, and may prevent magnetic flux from leaking outwardly.

The example uses a closed loop control method in which a position of the lens barrel 1510, in further detail, the carrier 1300, is detected and feed-backed.

Accordingly, a position sensor 1360 is required for closed loop control. The position sensor 1360 may be a hall sensor.

The position sensor 1360 is disposed inside or outside of the coil 1330. The position sensor 1360 may be mounted on the substrate 1130 on which the coil 1330 is mounted.

A magnet and a coil may be additionally provided to secure sufficient driving force during focusing. When an area, in which a magnet is mounted, is reduced with the trend for slimming of a camera module, a size of the magnet is decreased, and thus, sufficient driving force required for focusing may not be secured.

According to the present example, although not illustrated, magnets may be respectively attached to the different surface of the carrier 1300 and coils may be respectively provided on different surfaces of the housing 1100 to oppose the magnet. Thus, sufficient driving force for focusing may be secured even when a camera module is slimmed.

Referring to FIGS. 2 to 7, a shake correction unit of the lens driving device according to an example is illustrated.

The lens driving device includes a focusing unit, moving the carrier 1300 in an optical axis direction to perform focusing, and a shake correction unit moving the lens module 1500 disposed inside of the carrier 1300 in a direction perpendicular to the optical axis direction, to perform shake correction.

The shake correction unit has a structure generating driving force to move the lens module 1500, accommodated in the carrier 1300, in a first direction (an X-axis direction) and a second direction (a Y-axis direction), perpendicular to the optical axis direction (the Z-axis direction). The first direction and the second direction are perpendicular to each other.

The shake correction unit is used to correct image blurring or video shaking caused by user hand-shake, or the like, when an image or a video is captured. For example, when the shake occurs due to user hand-shake, or the like, at the time of capturing an image, a relative displacement corresponding to the shake is provided to the lens barrel 1510 to correct the shaking. As an example, the shake correction unit corrects the shaking by moving the lens barrel 1510 in a direction perpendicular to an optical axis (a Z axis).

The shake correction unit includes a frame 1400 and the lens module 1500 sequentially provided in the carrier 1300. The lens module 1500 includes a lens holder 1700 to which the lens barrel 1510 is coupled. The carrier 1300 may include the upper cover 1301 covering the frame 1400 and the lens module 1500 from above while they are disposed inside of the carrier 1300.

The shake correction unit according to this example may implement a structure in which the lens barrel 1510 may be moved as the frame 1400 and the lens holder 1700 are moved in the second direction (the Y-axis direction) and the first direction (the X-axis direction), respectively.

For example, the lens holder 1700, to which the lens barrel 1510 is fixed, is moved as the frame 1400 is moved in the second direction (the Y-axis direction) or the lens holder 1700 is moved in the first direction (the X-axis direction). For example, since the lens barrel 1510 is fixed to the lens holder 1700, the lens barrel 1510 is moved together with the movement of the lens holder 1700 and the lens barrel 1510 is a member moved while the lens holder 1700 is supported on the frame 1400. Therefore, the lens barrel 1510 is naturally moved together with the frame 1400 even when the frame 1400 is moved.

Due the above structure, when the frame 1400 is moved in the second direction (the Y-axis direction) or the lens holder 1700 is moved in the first direction (the X-axis direction), the lens barrel 1510 is moved together to correct shaking.

A driving portion of the shake correction unit includes a first driving portion, driving the frame 1400, and a second driving portion driving the lens holder 1700. The frame 1400 is driven while being in closely supported on a surface disposed to be parallel to the optical axis direction of the carrier 1300, and the lens holder 1700 is driven while being closely supported on a surface perpendicular to the optical axis direction. For example, in a relationship to a relative member, only the frame 1400 is closely supported in a direction perpendicular to the optical axis direction, and the lens holder 1700 may not be closely supported in the direction perpendicular to the optical axis direction, but may be closely supported on a surface disposed to be parallel to the optical axis direction.

The frame 1400 includes a first magnet 1420. The first magnet 1420 is disposed to oppose a first coil 1430, provided in the housing 1100, in a first direction (an X-axis direction) perpendicular to the optical axis direction.

In addition, the first magnet 1420 is magnetized to have at least N and S poles in a second direction (a Y-axis direction) perpendicular to a direction opposing the first coil 1430 (for example, the first magnet 1420 is magnetized such that a surface opposing the first coil 1430 has at least N and S poles in a direction perpendicular to the optical axis). Accordingly, when power is applied to the first coil 1430, force is generated to move the frame 1400 in the second direction (the Y-axis direction) depending on electromagnetic interaction of the first magnet 1420 and the first coil 1430.

The lens holder 1700 is provided with a second magnet 1720. The second magnet 1720 is disposed to oppose a second coil 1730, provided in the housing 1100, in the first direction (the X-axis direction) perpendicular to the optical axis direction. For example, the first magnet 1420 and a second magnet 1720 are disposed to be substantially parallel to each other. Accordingly, the first magnet 1420 and the second magnet 1720 may be disposed to oppose each other about the optical axis.

The second magnet 1720 may be magnetized such that a surface, opposing the second coil 1730, has a single pole of an N or S pole or a plurality of poles including the N and S poles. When power is applied to the second coil 1730, force is generated to move the lens holder 1700 in the first direction (the X-axis direction) by force to push or pull the second magnet 1720 and the second coil 1730 in direction opposing each other according to electromagnetic interaction of the second magnet 1720 and the second coil 1730.

The first coil 1430 and the second coil 1730 are fixed to the substrate 1130 together with the driving coil 1330 of the focusing unit, and the substrate 1130 is fixed to the housing 1100.

The frame 1400 is closely supported on a sidewall of the carrier 1300, for example, a surface disposed to be parallel to the optical axis direction, and the lens holder 1700 is closely supported on a surface of the frame 1400 in the optical axis direction, for example, a surface perpendicular to the optical axis direction.

The frame 1400 is supported on the sidewall of the carrier 1300 by attractive force with a first yoke 1450 provided in the housing 1100. Since the first yoke 1450 may be a metallic or non-metallic magnetic material to shield a magnetic field, magnetic flux generated by a coil, a magnet, or an interaction thereof may be prevented from leaking outwardly of the camera module 1000.

Figure 6:
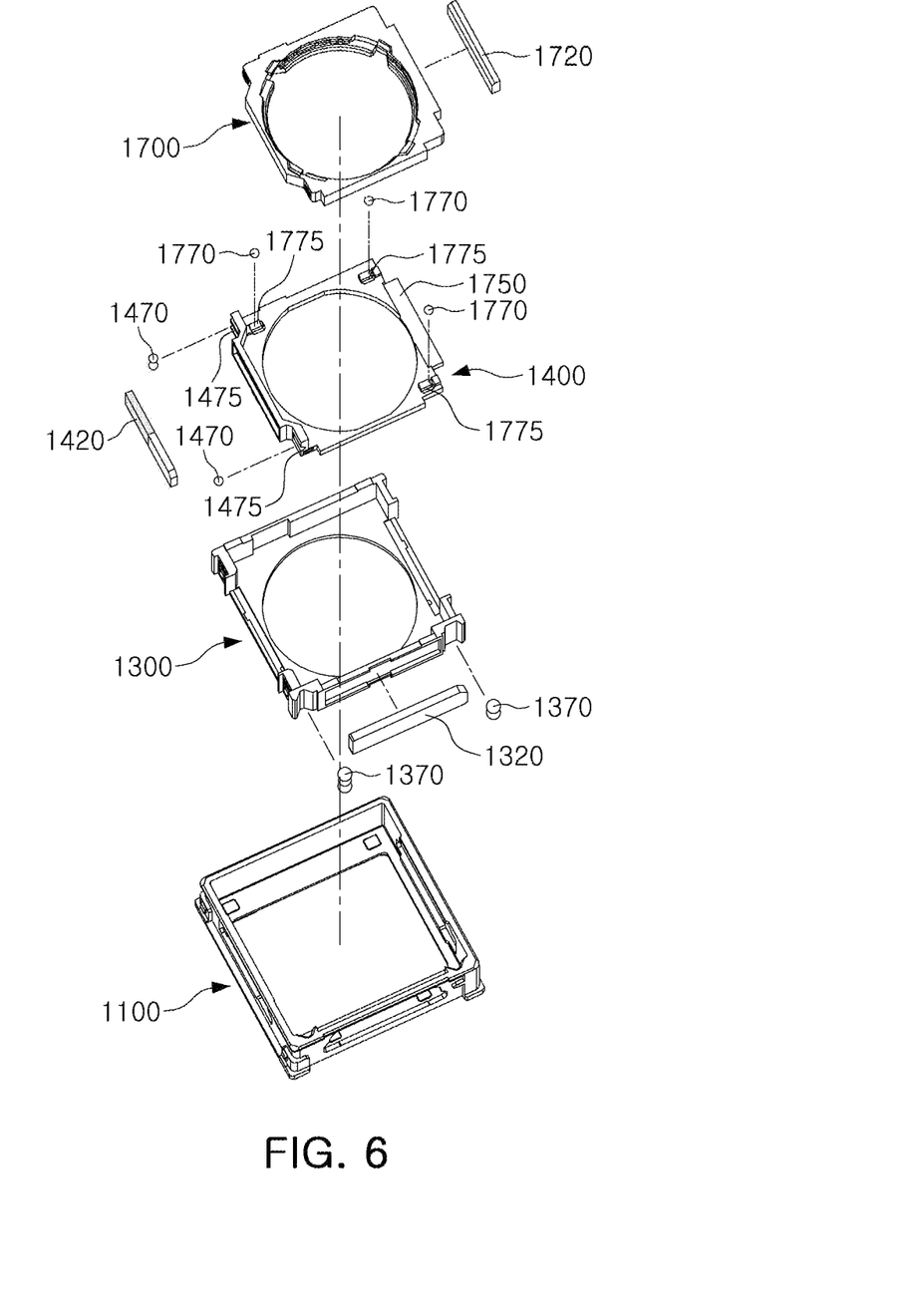
FIG. 6 is an exploded perspective view of a housing, a carrier, a frame, and a lens holder according to an example, when viewed from above.
Figure 7:
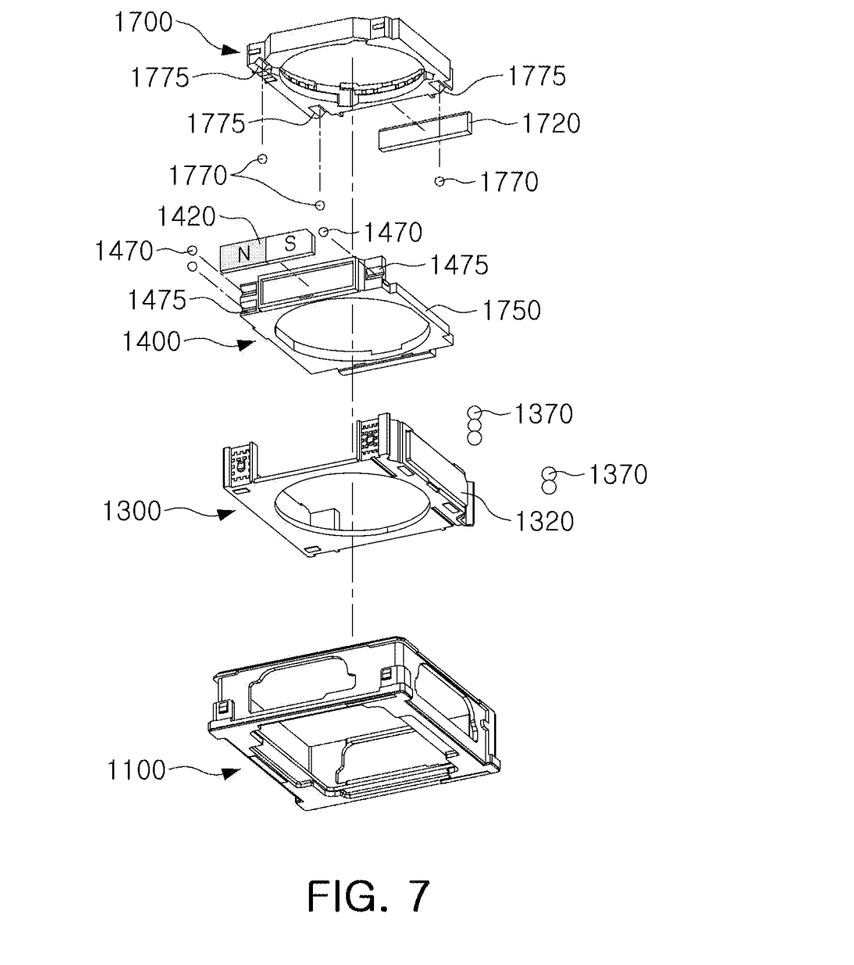
FIG. 7 is an exploded perspective view of a housing, a carrier, a frame, and a lens holder according to an example, when viewed from below.

The lens holder 1700 is supported on an upper surface (bottom) of the frame 1400 in the optical axis direction by attraction force with a second yoke 1750 provided in the frame 1400.

The first yoke 1450 is disposed to oppose the first magnet 1420 in the direction perpendicular to the optical axis direction, with the first coil 1410 interposed therebetween, and the second yoke 1750 is disposed to oppose the second magnet 1720 in the optical axis direction.

The first yoke 1450 may be disposed on a rear surface of the first coil 1430, and may allow the frame 1400 to be closely supported on an internal wall of the carrier 1300 in the direction perpendicular to the optical axis direction, by the attractive force with the first magnet 1420.

The second yoke 1750 may allow the lens holder 1700 to be closely supported on an upper surface (a bottom surface) of the frame 1400 in the optical axis direction by the attractive with the second magnet 1720. Since the second yoke 1750 and the second magnet 1720 are provided on only a portion based on the circumference of the frame 1400, the lens holder 1700 may be eccentrically supported on the frame 1400. Thus, a third yoke 1650 and a third magnet 1620 may be selectively provided on the lens holder 1700 and the frame 1400, respectively, to oppose each other in the optical axis direction.

The frame 1400 may include a first rolling member 1470 between and internal wall surface of the carrier 1300 (a surface disposed to be parallel to the optical axis direction) and the frame 1400 to be easily moved on the internal wall of the carrier 1300 in a sliding or rolling motion. The lens holder 1700 may include a second rolling member 1770 between a surface perpendicular to the frame 1400 in the optical axis direction and the lens holder 1700 to be easily moved in a sliding or rolling motion on an upper surface of the frame 1400.

A surface, on which the frame 1400 and the internal wall of the carrier 1300 oppose each other, may be provided with a first guide groove 1475 formed to be elongated in the second direction (the Y-axis direction) such that the first rolling member 2470 is easily moved in a sliding or rolling motion on at least one of the surfaces. A surface, on which the lens holder 1700 and the frame 1400 oppose each other, may be provided with a second guide groove 1775 formed to be elongated in the first direction (the X-axis direction) such that the second rolling member 1770 is easily moved in a sliding or rolling motion on at least one of the surfaces.

The first rolling member 1470 may be provided with one or two first magnets 1420 on external sides of both end portions thereof, respectively, to form a triangle or a quadrangle. Each first rolling member 1470 may be provided with at least one rolling member in each first guide groove 1475.

The second rolling member 1770 is provided with a total of three or four rolling members, including two rolling members respectively disposed on both sides of the second magnet 1720, to form a triangle or a quadrangle. Each second rolling member 1770 may be provided with at least one rolling member in each second guide groove 1775. When three second rolling members 1770 are provided to form a triangle, they may be arranged to form an approximately right triangle. The second magnet 1720 may be provided between two second rolling members 1770, among the three second rolling members 1770, to balance suction force in the optical axis direction, and the third magnet 1620 or the third yoke 1650 may be provided to be closest to the remaining one second rolling member 1770.

The first and second magnets 1420 and 1720 of the shake correction driving unit including the first driving unit and the second driving unit are mounted on the first and second frames 1400 and 1700, respectively. The first and second coils 1430 and 1730, respectively opposing the first and second magnets 1420 and 1720, are mounted in the housing 1100. For ease of description, in a portion of the drawings, the first and second coils 1430 and 1730 are illustrated as being disposed on a side of the carrier 1300. However, referring to FIG. 2, both of the first and second coils 1430 and 1730 may be mounted in the housing 1100.

The first and second magnets 1420 and 1720 are movable members, moving together with the lens module 1500 in a direction perpendicular to the optical axis (the Z-axis), and the first and second coils 1430 and 1730 are fixed members fixed to the housing 1100. However, the configuration is not limited thereto, and positions of the first and second magnets 1420 and 1720 and the first and second coils 1430 and 1730 are interchangeable with each other.

The shake correction driving unit may use a closed loop control method in which the positions of the frame 1400 and the lens holder 1700 are continuously sensed and reflected on driving. Accordingly, the frame 1400 and the lens holder 1700 may include first and second position sensors 1460 and 1760, opposing the first and second magnets 1420 and 1470, to sense the positions of the frame 1400 and the lens holder 1700. In this case, the first and second position sensors 1460 and 1760 may be provided inside or by the first and second coils 1430 and 1730 of the substrate 1130.

This example includes all structures in which one or two or more first and second coils 1430 and 1730, opposing the first and second magnets 1420 and 1470 provided on the frame 1400 and the lens holder 1700, are provided, respectively. When two or more first and second coils 1430 and 1730 are provided, the amount of magnetic flux may be adjusted to more efficiently prevent leakage of the magnetic flux.

In the camera module 1000 according to this example, side surfaces of the housing 1100 using a VCM actuator using a magnet and a coil may all be finished with a yoke, capable of preventing leakage of magnetic flux. As a result, leakage of a magnetic field may be effectively prevented.

The camera module 1000 according to this example has a structure in which the housing 1100, the carrier 1300, the frame 1400 and the lens module 1500 are sequentially provided in the optical axis direction, the carrier 1300 is moved in the optical axis direction to implement an autofocusing (AF) function, and the frame 1400 and the lens module 1500 are moved in the first direction and the second direction, perpendicular to the optical axis, from an upper portion of the carrier 1300 to implement optical image stabilization (OIS).

To implement the optical image stabilization (OIS), the frame 1400 is moved in a second direction, perpendicular to the optical axis (the Y-axis direction), while being supported on the sidewall of the carrier 1300 parallel to the optical axis direction, and the lens module 1500 (in further detail, the lens barrel 1510 or the lens holder 1700) is moved in the first direction (the X-axis direction), perpendicular to the optical axis direction, while being supported on a bottom surface perpendicular to the optical axis direction of the frame 1400.

However, the configuration is not limited thereto. To implement optical image stabilization (OIS) according to another example, directions or surfaces of the frame 1400 and the lens module 1500 are interchangeable with each other.

For example, to implement optical image stabilization (OIS) according to another example, the frame 1400 may be moved in the second direction (the Y-axis direction), perpendicular to the optical axis, while being supported on a bottom surface, a surface perpendicular to the optical axis direction of the carrier 1300, and the lens module 1500 (in further detail, the lens barrel 1510 or the lens holder 1700) may be moved in the first direction (the X-axis direction), perpendicular to the optical axis, while being supported on the sidewall of the frame 1400 parallel to the optical axis direction.

In this case, the first magnet 1420 provided in the frame 1400 may be magnetized to an N-pole or an S-pole of a single-pole magnet, or a plurality of poles including the N-pole and the S-pole, and may allow attractive force or repulsive force to be generated between the first coil 1430, provided in the housing 1100, and the first magnet 1420 in directions opposing each other. Thus, force may be generated to move the frame 1400 in the first direction (the X-axis direction), the second magnet 1720 provided in the lens module 1500 may use a magnet magnetized to multiple poles including N-pole and S-pole in the direction, perpendicular to the optical axis direction, and the lens module 1500 may be moved along a surface, opposing the second coil 1730 provided in the housing 1100, in the second direction (the Y-axis direction) perpendicular to the optical axis direction.

In this case, the housing 1100 may be provided with a yoke covering the second coil 1730, and the second magnet 1720 provided in the lens module 1500 may be closely supported on a sidewall of the frame 1400, for example, a surface disposed to be parallel to the optical axis direction, by attractive force with the yoke. However, since the frame 1400 should be movable in a direction parallel to the direction in which the frame 1400 is closely supported, force significantly greater than attractive force between the lens module 1500 and the frame 1400 may be required by interaction between the first magnet 1420 and the first coil 1430. Alternatively, a yoke may be provided on the frame 1400, a movable member, rather than the housing 1100, to prevent attractive force between the yoke and the second magnet 1720 from affecting movement of the frame 1400.

In addition, the frame 1400 may be provided with a rolling member interposed between the carrier 1300 and a surface perpendicular to the optical axis direction, and the lens module 1500 may be provided with a rolling member interposed between the frame 1400 and the surface perpendicular to the optical axis direction.

Detailed descriptions of other examples are omitted, but an overall structure of a camera module may be modified with reference to a structural concept of the camera module 1000.

As described above, leakage of a magnetic field may be significantly reduced while employing an actuator using a magnet and a coil. Thus, miniaturization and accuracy in driving of a camera module may be implemented.

In addition, even when camera modules are arranged to be adjacent to each other, magnetic field interference may be significantly reduced. Thus, the camera modules may be freely arranged.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a carrier supported on a housing and movable in an optical axis direction;
   a frame supported on the carrier and comprising a first magnet configured to interact with a first coil such that the frame is moved relative to the carrier in a first direction perpendicular to the optical axis direction; and
   a lens module supported on the frame and comprising a second magnet configured to interact with a second coil such that the lens module is moved relative to the frame in a second direction perpendicular to the optical axis direction and the first direction,
   wherein one of the frame and the lens module is supported to a relative member by an attractive force acting in one of the first direction and the second direction, and
   wherein the housing includes a yoke facing one of the first magnet and the second magnet along one of the first direction and the second direction, and the attractive force acts between the yoke and the one of the first magnet and the second magnet in the respective first direction or second direction.

2. The camera module of claim 1, wherein the other of the frame and the lens module is arranged such that attractive force does not act between the relative member and the frame in one of the first direction and the second direction.

3. The camera module of claim 1, wherein the other of the frame and the lens module is arranged such that attractive force acts between the relative member and the frame in the optical axis direction.

4. The camera module of claim 1, wherein the housing comprises a side surface on which one of the frame and the lens module is supported and the yoke is disposed, and the yoke is formed of a material configured to prevent leakage of a magnetic field is disposed on the side surface.

5. The camera module of claim 1,
wherein the first magnet and the first yoke are arranged to have an interval in the second direction.

6. The camera module of claim 1, wherein the first magnet is magnetized along a surface opposing the carrier in the second direction to have at least an N-pole and an S-pole.

7. The camera module of claim 1, wherein a surface of the second magnet opposing the carrier is magnetized to a single pole or a plurality of poles.

8. The camera module of claim 1, wherein the first magnet and the second magnet are disposed to oppose each other about an optical axis.

9. The camera module of claim 1, wherein the lens module comprises one of a third magnet and a second yoke, and
the frame comprises the other of the third magnet and the second yoke to oppose the third magnet or the second yoke in the optical axis direction.

10. The camera module of claim 9, further comprising three rolling members disposed between the lens module and a surface of the frame in the optical axis direction, and
the second magnet is disposed between two rolling members, among the three rolling members, and the third magnet or the second yoke is disposed closer to the other rolling member than the two rolling members.

11. The camera module of claim 10, wherein the three rolling members are disposed to approximately form a right triangle.

12. A camera module comprising:
a carrier supported on a housing and movable in an optical axis direction;
a frame supported on the carrier and comprising a first magnet configured to be movable, relative to the carrier, in a first direction perpendicular to the optical axis direction; and
a lens module supported on the frame and comprising a second magnet configured to be movable, relative to the frame, in a second direction perpendicular to the optical axis direction,
wherein the first magnet and the second magnet oppose each other about an optical axis,
wherein one of the first magnet and the second magnet is magnetized along a surface opposing a relative member in one of the first direction and the second direction to have at least an N-pole and an S-pole, and
the other of the first magnet and the second magnet is magnetized such that the surface opposing the relative member has a single pole or a plurality of poles.

13. A camera module comprising:
a frame comprising a first magnet configured to generate force to move the frame along a first direction perpendicular to an optical axis;
a lens holder coupled to the frame and comprising a second magnet configured to generate force to move the lens holder relative to the frame along a second direction perpendicular to the optical axis, the second magnet being disposed opposite to the first magnet across the optical axis; and
a lens barrel fixed to the lens holder and configured to be moved along the first direction by movement of the frame and to be moved along the second direction by movement of the lens holder relative to the frame.

14. The camera module of claim 13, wherein one of the first magnet and the second magnet is a polarizing magnet and the other of the first magnet and the second magnet is a single pole magnet.

15. The camera module of claim 14, further comprising:
a first coil disposed to face the first magnet along the first direction; and
a second coil disposed to face the second magnet along the first direction.

16. The camera module of claim 15, further comprising:
a first yoke disposed to oppose the first magnet along the first direction such that the first coil is interposed between the first yoke and the first magnet; and
a second yoke disposed to oppose the second magnet in a direction parallel to the optical axis.

* * * * *